United States Patent [19]

Greathouse

[11] 4,147,027
[45] Apr. 3, 1979

[54] THRUST REVERSER NOZZLE

[75] Inventor: William K. Greathouse, East Northport, N.Y.

[73] Assignee: Grumman Aerospace Corporation, Bethpage, N.Y.

[21] Appl. No.: 810,779

[22] Filed: Jun. 28, 1977

Related U.S. Application Data

[63] Continuation of Ser. No. 674,282, Apr. 6, 1976, abandoned.

[51] Int. Cl.$^2$ .................. F02K 1/20; F02K 3/04
[52] U.S. Cl. .................. 60/226 A; 60/230; 239/265.37
[58] Field of Search .................. 60/226 A, 230, 232; 239/265.19, 265.37

[56] References Cited

U.S. PATENT DOCUMENTS

| | | | |
|---|---|---|---|
| 3,550,855 | 12/1970 | Feld et al. | 60/230 |
| 3,567,128 | 3/1971 | Urquhart et al. | 60/232 |
| 3,570,247 | 3/1971 | Denning et al. | 239/265.19 |
| 3,604,662 | 9/1971 | Nelson et al. | 60/230 |
| 3,610,534 | 10/1971 | Medawar et al. | 239/265.37 |
| 3,856,239 | 12/1974 | Leibach | 239/265.19 |
| 3,984,974 | 10/1976 | Medawar et al. | 60/230 |

FOREIGN PATENT DOCUMENTS

| | | | |
|---|---|---|---|
| 646039 | 4/1960 | Italy | 239/265.19 |
| 1254829 | 11/1971 | United Kingdom | 239/265.19 |

*Primary Examiner*—Robert E. Garrett
*Attorney, Agent, or Firm*—Mellor A. Gill

[57] ABSTRACT

A thrust reverser nozzle for coaxial-flow turbofan engines comprising target-type deflector doors which are hinged for deployment about a fixed axis by means of actuation about single fixed pivots mounted on support structure on either side of the engine nacelle rearward portion. The deflector door's outer surfaces are shaped to match existing aerodynamic contours of the aircraft engine nacelle so as to provide a lower boattail angle for improved drag characteristics in the stowed or normal flight position. In that position, the deflector door interior configuration comprises a portion upstream of the engine exhaust nozzle exit plane and a downstream "fishmouth" portion through which flows hot engine exhaust gases surrounded circumferentially by cool air discharged from the engine fan. Geometry of the stowed fishmouth is sized and shaped to take advantage of mixing and shearing action between the exhaust streams so as to produce a desired variable area nozzle effect on the engine operation and thereby improve its forward thrust performance. Geometry of the upstream portion of the inside surface of the doors is sized and shaped with end plates so that when the deflector doors move to the deployed position, the exhaust streams are diverted outward and forward to produce a desired level of reverse thrust.

1 Claim, 10 Drawing Figures

THRUST REVERSER NOZZLE

This is a continuation, of application Ser. No. 674,282 filed Apr. 6, 1976, now abandoned.

BACKGROUND OF THE INVENTION

Field of the Invention

The present invention relates to thrust reverser exhaust nozzles and, more particularly, to an improved fixed-pivot, target-type thrust reverser nozzle for coaxial-flow turbofan engine exhausts.

SUMMARY OF THE INVENTION

This invention lies in the art of nozzle and thrust reverser design for gas turbine engines, commonly called jet engines, which produce reaction thrust for the propulsion of a vehicle by ejecting a high velocity stream of gas from the engine. It is desirable in aircraft applications of gas turbines to incorporate thrust reversal devices as a means for controlling the speed and other parameters during the various operating modes of the vehicle. A particularly important use of thrust reversal means is directed to the reduction of the burden on the vehicle brakes during the landing run. However, when a thrust reverser is used on an engine, it is important to not adversely influence engine operation either when the reverser is deployed for use or when stowed for normal flight: this consideration is a critical factor in the design of these devices.

Many different types of thrust reversers have been developed using the principle of blocking the efflux from the engine and diverting the blocked flow laterally or forwardly to thereby produce negative thrust. One type, which is commonly termed the "pivoted target" type reverser, employs pivoted deflector doors which are swung directly behind and in the path of the engine nozzle efflux. Another type uses openings in the sidewalls of the nozzle or surrounding shroud together with deflector doors which are swung toward the engine axis to block rearward flow, the doors extending outward to direct the diverted flow in a lateral or forward direction. Still another type utilizes cascade sets of gas turning vanes in the sidewalls of the engine shroud together with various means to block rearward flow and uncover the cascades such that a negative thrust is produced by engine efflux exiting therethrough. All of the various types of thrust reversers have particular merits and the appropriate types have been uses successfully in single-flow turbojets, common-flow turbofans, short duct turbofans, and the like gas turbine engines. Their principal problems have been cost, weight, forward thrust losses, drag, and complexity coupled with the usual high maintenance expense resulting therefrom.

The present invention is directed to thrust reversing nozzle means for gas turbine engines of the front fan, coaxial-flow turbofan type. In this type engine, the fan is enclosed in a shroud which surrounds the core engine cowl coaxially and which is spaced outwardly therefrom to define an annular passage or duct through which the flow from the front fan is exhausted. The various components of the engine are sized to obtain a desired ratio between the fan or "bypass" flow and the exhaust or "core" flow from the gas turbine. In such turbofan engines, a large proportion of the total thrust is generally developed by the reaction of the bypass air driven rearward by the fan while the balance of the thrust results from the reaction of the core gas stream exhausting from the turbine itself.

Three different tailpipe configurations are employed on present-day turbofan engines. In one type, the fan air is mixed, either partially or completely, with the turbine exhaust gases inside a common tailpipe and is discharged from a single nozzle. In a second type, the fan air is directed rearwardly through a short duct from which the fan air is discharged by an annular nozzle which is located well upstream of the turbine exhaust nozzle. The tailpipe configuration with which the present invention is particularly concerned is of a third type comprising a coaxial-flow turbofan tailpipe having a central turbine exhaust core nozzle surrounded by a long annular fan duct and nozzle which discharges in the vicinity, usually slightly upstream, of the core nozzle exit plane.

In conventional practice, thrust reversers for coaxial-flow turbofan engines are usually designed only to stow upstream of the nozzle exit planes and outside of the fan tailpipe because it was believed that to do otherwise would adversely influence engine operation and forward thrust. The pivoted target-type reverser embodied in the present invention stows partly downstream of the nozzle exits and is designed to have a favorable effect on engine operation and forward thrust. Designs which stow upstream, whether they be of the target, cascade, or combined types, are complicated and heavy since they must be translated rearward and then moved into the deployed position. The present design, therefore, is less complex and lighter in weight since it simply pivots from the stowed position to the deployed position. A further advantage is that faster deployment and stowage times are attainable over designs requiring greater travel for operation.

Engine operation and forward thrust are improved with the present invention because geometry of the stowed reverser is designed to have a favorable effect on the fan and core nozzle operating characteristics. This effect is achieved by proper design of the internal surfaces which extend downstream of the nozzles to form what is termed a "fishmouth" nozzle. External geometry of the fishmouth nozzle is shaped to blend with aerodynamic contours of the engine nacelle and thereby reduces drag because of improved nacelle lines and less boattail angle.

Coaxial-flow turbofan engine performance can be improved by use of variable area exhaust nozzles rather than fixed geometry nozzles. Variable area designs are seldom employed because the extra weight offsets most of the performance gains. However, the favorable effects of variable area can also be realized by changing the nozzle discharge coefficient without changing physical size or shape. This is because nozzle effective area is equal to actual area times discharge coefficient. The stowed thrust reverser geometry of this invention increases discharge coefficients of both the core nozzle and the fan nozzle at takeoff conditions while producing no change at cruise conditions. The results are more engine airflow and thrust (or less fuel flow for same thrust) for takeoff without degrading engine performance at cruise.

DESCRIPTION OF THE PRIOR ART

It is an increasingly common practice in vehicles, particularly in aircraft, employing gas turbines for propulsion to install thrust reversers on the exhaust tailpipes to thereby obtain aerodynamic braking and to serve other control functions. Of interest in the prior art are the blocker door thrust reversers disclosed by W. L. Greene (U.S. Pat. No. 2,753,684); G. T. Drakeley (U.S. Pat. No. 2,839,891); E. Schatzki (U.S. Pat. No. 3,002,342); R. E. Meyer (U.S. Pat. No. 3,013,386); S. H. Feld (U.S. Pat. No. 3,550,855); G. R. Urquhart et al (U.S. Pat. No. 3,567,128); H. E. Nelson, Jr. (U.S. Pat. No. 3,579,991); J. H. Hilbig (U.S. Pat. No. 3,601,340); N. Searle et al (U.S. Pat. No. 3,640,468); and A. Gozlan (U.S. Pat. No. 3,660,982). Of these prior art showings of blocker door thrust reversers generally similar to the target door reverser of the present invention, only Searle et al disclose a thrust reverser used with a front fan, coaxial-flow turbofan engine, however, Searle et al as well as Meyer, teach thrust reversers having blocker doors operating about a pivot which moves in translation in the course of actuating the doors. The requirement for translating the pivot in this type of mechanism introduces a degree of complexity that raises questions as to first cost, reliability, maintainability, and the like, that are answered by the straight-forward, fixed-pivot design of the subject invention. The thrust reversers disclosed in the balance of the previously enumerated prior art are of the single, fixed-pivot type, however, these prior art teachings of fixed-pivot constructions show such reversers used with turbojet engines of various types rather than with a turbofan engine. The problem of installing a target-type reverser on a coaxial-flow turbofan engine, does not appear to have been addressed in the prior art.

Regarding thrust losses and engine effects, the state-of-the-art practice has been to accept forward thrust losses of up to one percent for a typical thrust reverser installation. No teachings exist in the prior art which lead to installation gains such as those attained with the present invention due to engine performance improvements and drag reduction. The overall geometry of this invention allows new and advantageous results to be attained for thrust reverser installations on modern aircraft powered with coaxial-flow turbofan engines because it provides a unique combination of desirable features such as more than 40% reverse thrust, improved forward thrust, lower nacelle drag, simple actuation, rugged construction, light weight and low cost.

OBJECTS OF THE INVENTION

It will be appreciated that practical applications of the simple, fixed-pivot target-type thrust reverser require a construction in which the stowed reverser does not influence engine operation adversely. The discovery by the inventor of the novel configuration of this invention for the interior geometry of a target-type reverser nozzle for coaxial-flow turbofan tailpipes has allowed new and advantageous results to be attained. Thus, it is an important object of this invention to provide a thrust reverser nozzle for a coaxial-flow turbofan engine which, in the stowed position, favorably influences the operating characteristics of the engine in comparison to its performance with a standard tailpipe.

It is a related object of this invention to provide an economical, compact, and structurally rigid thrust reverser means which can be readily installed on existing aircraft and which provides means for maintaining existing aerodynamic contours to achieve low drag without unduly interfering with the cooling, ventilation, and other normal operating functions of the engine installation or nacelle.

Another object of this invention is to provide a simple uncomplicated thrust reverser which lends itself to a light-weight, rugged construction of such stiffness that it is feasible to deploy and stow the target-type doors by actuation from only one side to thereby further reduce the cost, weight, and complexity of the mechanism.

Other and further objects of the invention will become apparent from the detailed description of the invention given in the accompanying specification and drawings.

DESCRIPTION OF THE DRAWINGS

For the purpose of illustrating the invention, there is shown in the drawings the forms which are presently preferred, it should be understood, however, that the invention is not necessarily limited to the precise arrangements and instrumentalities here shown.

DESCRIPTION OF THE PREFERRED EMBODIMENTS

As stated previously, the thrust reverser nozzle embodied in this invention can be used with particular advantage with coaxial flow turbofan engines. Although the invention is set forth as being used in an aircraft, it will be recognized that thrust reversers can be used with applicable modification in other vehicles such as Ground Effect Machines and the like. Also, in aircraft use, although a nacelle installation is described, a tailmounted fuselage installation is equally applicable for use in aircraft of suitable design.

Figure 1:
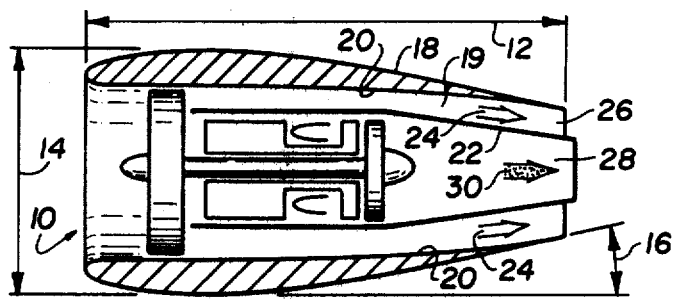
FIG. 1 is a diagrammatical side view of a conventional turbofan-propelled aircraft engine nacelle containing standard coaxial tailpipes.

In typical prior art aircraft use, the coaxial flow turbofan engine, illustrated in FIG. 1, is housed in structure such as nacelle 10 having an overall length 12, a maximum diameter 14 and a boattail angle 16. The nacelle outer wall 18 encloses an annular fan duct 19 formed between the coaxial fan tailpipe 20 and the turbine exhaust tailpipe 22. Fan airflow 24 is discharged through the fan nozzle 26 in the general vicinity of the core nozzle 28 from which the hot turbine exhaust gases 30 are discharged.

Figure 2:
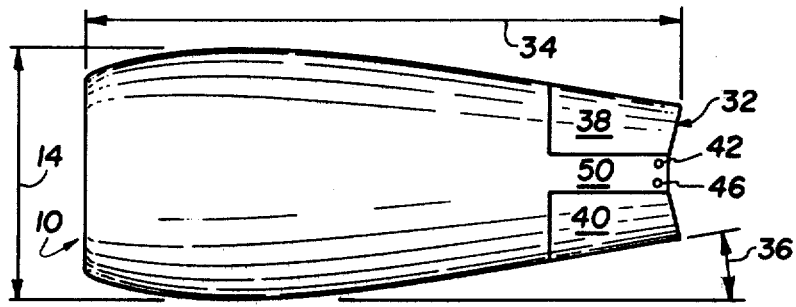
FIG. 2 is a side view of the engine nacelle of a turbofan-propelled aircraft incorporating an embodiment of the thrust reverser of the invention and illustrating the reverser in the stowed position.

For nacelle installation, the preferred embodiment of the thrust reverser 32 of this invention is arranged so as to form a rearward extension of nacelle 10 as illustrated by FIG. 2 in the stowed position for normal flight. Aerodynamic contours of the nacelle are improved by installation of the reverser since overall length 34 has increased and boattail angle 36 has decreased relative to a typical prior art nacelle without a thrust reverser (length 12 and angle 16 of FIG. 1).

Figure 3:
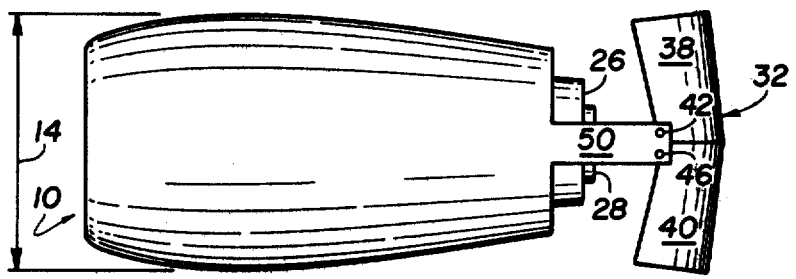
FIG. 3 is a side view of the embodiment of the thrust reverser of FIG. 2 in the fully deployed position.

The construction is such that the reverser 32 has an upper shell or deflector door 38 and a lower shell or deflector door 40 which move about fixed pivots 42, 44, 46 and 48 to form a target-type configuration in the deployed or thrust reversing position as illustrated by FIG. 3. (The terminology "upper" and "lower" with respect to doors 38 and 40 is used as a matter of convenience for it will be appreciated that orientation can be in some other direction relative to the nacelle, for example, the right and left sides thereof.) The four pivots 42, 44, 46 and 48 are fixed to and supported by stangs 50 and 52 which are rigidly secured to nacelle 10 structure (not shown) and/or the fan duct 20 on both sides.

Figure 4:
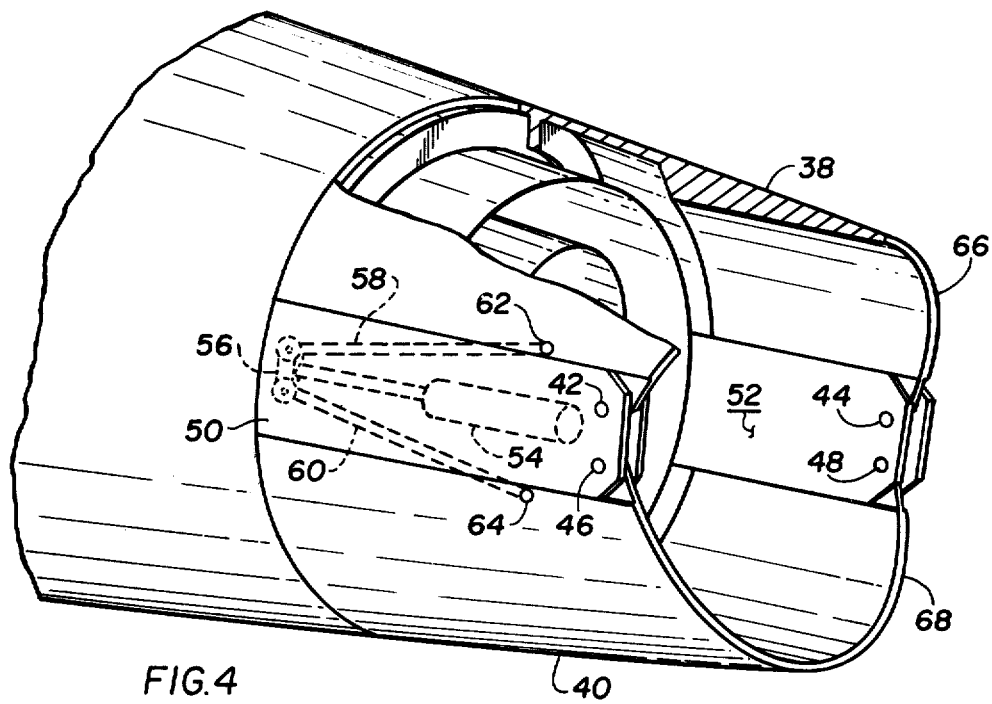
FIG. 4 is a perspective view partially in section of an embodiment of the thrust reverser of this invention in the stowed position showing the structural stang supports for deflector doors and typical actuation mechanism on one side of the reverser.
Figure 5:
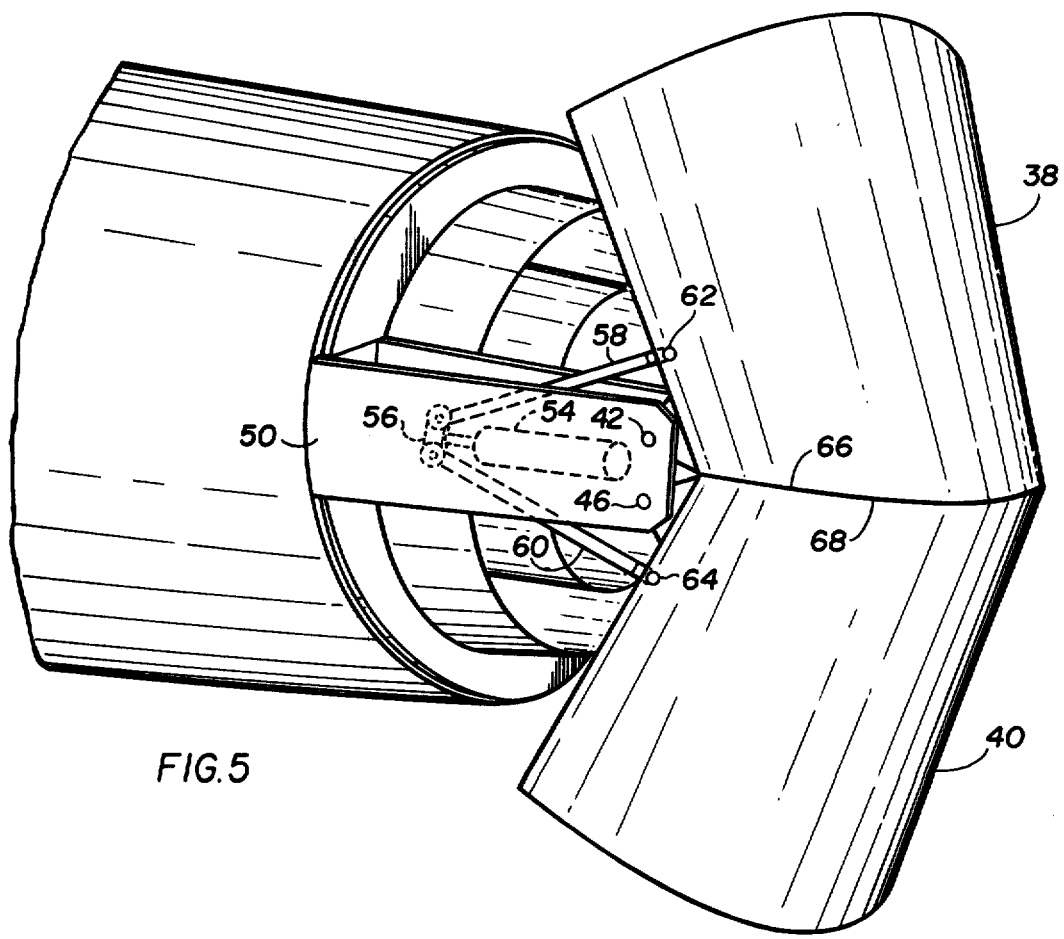
FIG. 5 is a perspective view of the embodiment of FIG. 4 with the actuator mechanism and the deflector doors in the deployed position.

Stowing and deployment of the thrust reverser perhaps as best shown in FIGS. 4 and 5, is by means of a suitable double acting power cylinder or actuator 54 having an oscillating drive linkage 56 which is pivotally connected to pushrods 58 and 60, the distal ends of which are pivotally connected at 62 and 64 to deflector doors 38 and 40 which pivot so that door edges 66 and 68 meet when fully deployed. The construction of the doors and their requirement for only simple pivotal movement in operation permits a high level of strength and rigidity in a light-weight design. These characteristics, combined with the simple drive mechanism permitted by the fixed pivot, makes it feasible to deploy and stow the doors using actuating means on one side only of the reverser assembly. Actuator 54, of course, can be any suitable hydraulic, pneumatic, or electrical type, and it will be understood that any suitable drive mechanism other than that shown can be employed to deploy or stow the reverser.

Figure 6:
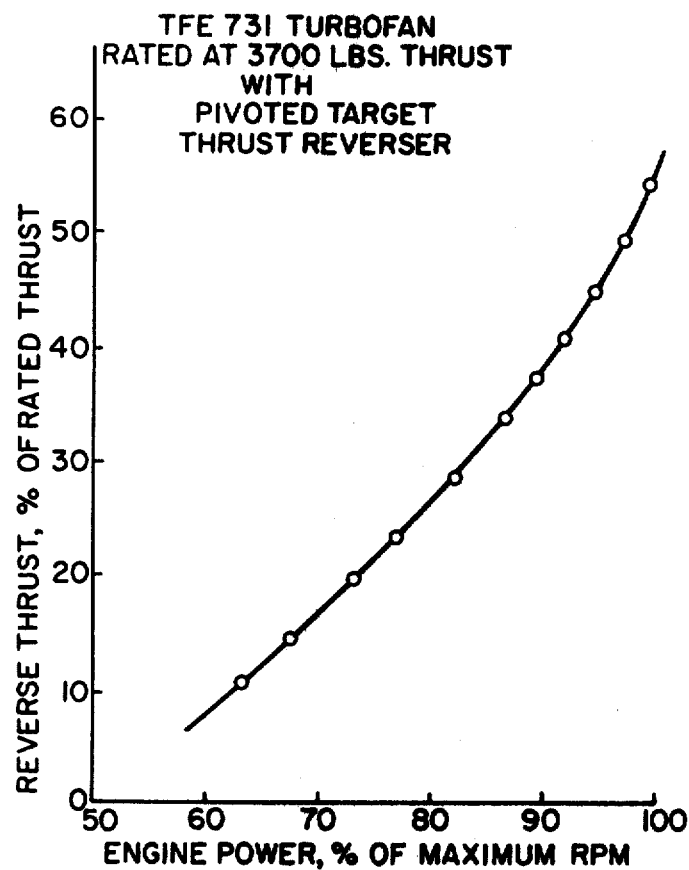
FIG. 6 is a plot for a turbofan engine of reverse thrust data versus engine power level for the reverser geometry of an embodiment of the present invention in the deployed position.

When fully deployed as illustrated in FIG. 5, the after edges of the doors meet and form a configuration that is termed the "target". A net reaction force (reverse thrust) is produced as the target blocks rearward flow from the engine and turns the flow partly forward. A desired level of reverse thrust for a particular engine is attained by proper design of the target geometry. As an example of the reverse thrust characteristics available with the target geometry of this invention, full-scale engine/reverser test data is presented in FIG. 6 for a typical aircraft installation. It will be noted that reverse thrust values well above the approximately forty percent level of the prior art are provided.

Figure 7:
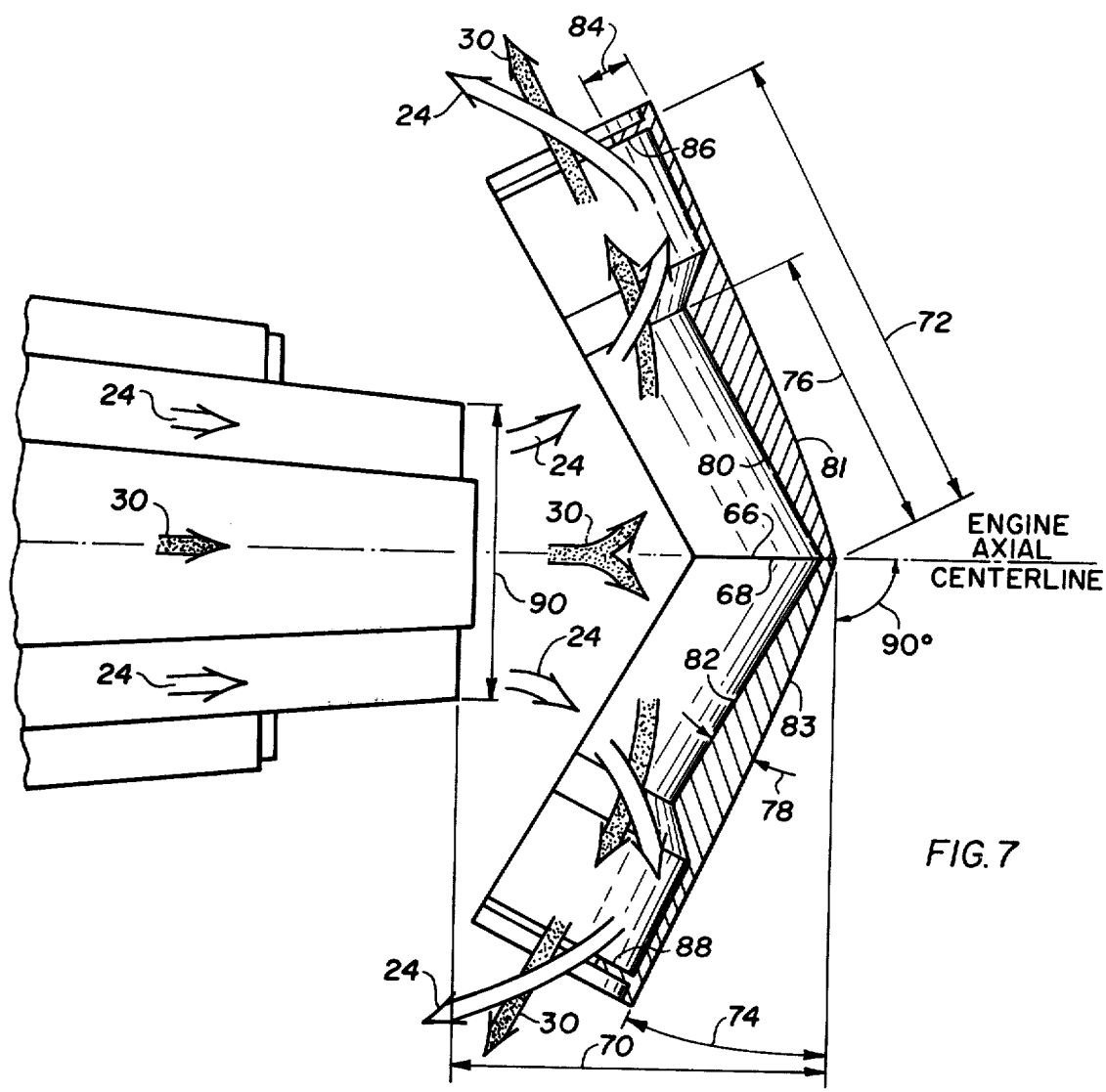
FIG. 7 is a side sectional-view of an embodiment of the thrust reverser of the invention in the deployed position illustrating the deflected flow paths of the fan and core gas streams as they are turned by the target assembly.
Figure 8:
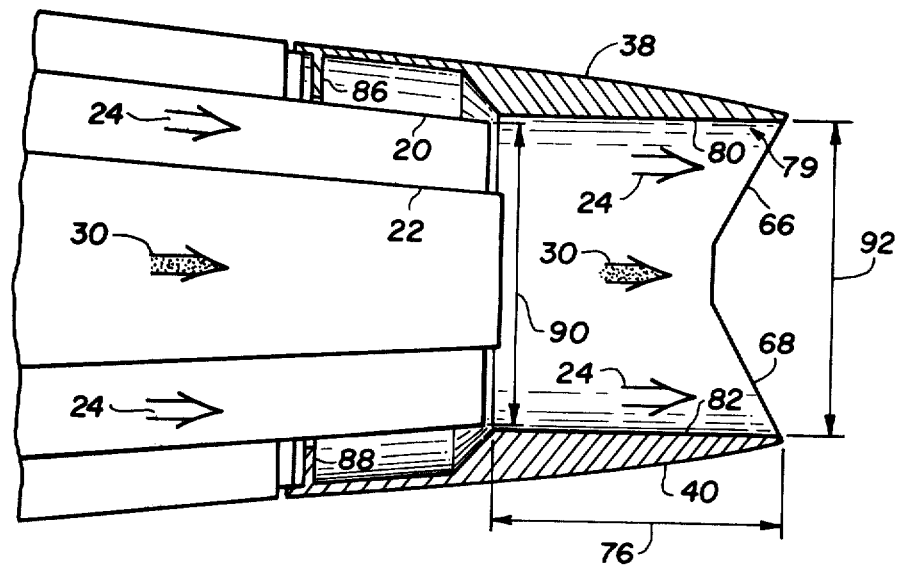
FIG. 8 is a sectional side view of an embodiment of the thrust reverser of the invention in the stowed position illustrating the flow paths of the fan and core gas streams as they pass through the fishmouth-shaped nozzle.

Design of the target geometry involves considerations of size, shape, and location relative to the engine exhaust nozzles. Important design parameters, shown in FIGS. 7 and 8 are target spacing 70, overall door length (to end plates 86, 88) 72, sweep angle 74, length 76 of the substantially cylindrical interior section 79, ramp angle 78 between inside surfaces 80, 82, and outside surfaces 81, 83, respectively of the doors, the height 84 of door end plates or lips 86, 88, the overall diameter 90 of the fan nozzle, and the diameter 92 of the fishmouth nozzle. It will be noted that the dimensions of the doors are related to the overall diameter 90 of the fan nozzle. Sizing of the target doors for larger or smaller engines is accomplished by scaling all dimensions up or down relative to the diameter 90. As is known in the art also, the change of one parameter in a specific design as, for example, the ramp angle 78, will generally require a change in other parameters such as the height of the end plates 86, 88, and the like. In accordance with the invention, the relative angles and dimensions of interest for reverse thrust levels between thirty and fifty percent of rated forward thrust comprise:

| Sweep Angle 74 | = 10 to 25 | degrees |
| Ramp Angle 78 | = 0 to 15 | degrees |
| End Plate Height 84 | = 0 to 0.20 | nozzle diameters |
| Interior Section Length 76 | = 0.5 to 1 | nozzle diameter |
| Door Length 72 | = 1 to 2 | nozzle diameters |
| Target Spacing 70 | = 1 to 2 | nozzle diameters. |

In the design of a thrust reverser nozzle for a front-fan, coaxial-flow turbofan engine currently in use, the pertinent angles and dimensions of the above-listed parameters preferably are:

| Sweep Angle | = 12° |
| Ramp Angle | = 9° |
| End Plate Height | = 3.3 in. |
| Interior Section Length | = 15.3 in. |
| Door Length | = 24.6 in. |
| Target Spacing | = 22.7 in. |

Also shown in FIG. 7 are the flow paths of the fan exhaust air 24 and the engine turbine hot exhaust gas 30 from the core nozzle as they are deflected by the deployed target. Surfaces 80 and 82 of interior section 79 are directly exposed to hot turbine exhaust gases 30 and must therefore be fabricated as is well known in the art from materials suitable for about one thousand degrees Fahrenheit. At other places, mixing of fan airflow 24 with hot gases 30 lowers the temperature somewhat so that various other suitable known materials may be employed.

When the deflector doors are stowed for normal flight as shown in FIG. 8, surfaces 80 and 82, extend downstream of the fan and core nozzles. This extended nozzle is termed the "fishmouth" because of the exit shape formed by door edges 66 and 68. The stowed reverser assembly is not exposed to high temperatures because exhaust gases 30 flow through the center of the fishmouth with substantially little or no contact with the deflector door surfaces.

Conventional tailpipe nozzles for coaxial flow turbofan engines (such as illustrated in FIG. 1) have specific flow characteristics which result in engine operation at a certain level of performance. Addition of the fishmouth nozzle of the stowed reverser configuration (FIG. 8) does not change these flow characteristics or affect engine performance at normal aircraft cruise conditions. However, the fishmouth internal geometry is designed to increase nozzle flow characteristics at takeoff conditions and thereby improves engine performance for such operation. To achieve the new and improved characteristics of the present invention, the nozzle fishmouth diameter 92 (see FIG. 8) must be sized slightly larger, ranging from about zero to about five percent, than the annular fan nozzle diameter 90. For the aforementioned currently used turbofan engine having a fan nozzle diameter 90 of 19.6 inches, the fishmouth diameter 92 preferably is 19.8 inches. For that engine, the preferred spacing ratio $$\frac{\text{target spacing (70)}}{\text{fan nozzle diameter (90)}} = 1.16,$$

the preferred diameter ratio $$\frac{\text{fishmouth diameter (92)}}{\text{fan nozzle diameter (90)}} = 1.01,$$

and the preferred flow area ratio $$\frac{A_{FM}}{A_{FN} + A_{CN}} = 1.028,$$

(where $A_{FM}$ is the flow area of the fishmouth nozzle, $A_{FN}$ is the flow area of the fan nozzle, and $A_{CN}$ is the flow area of the engine core nozzle).

Figure 9:
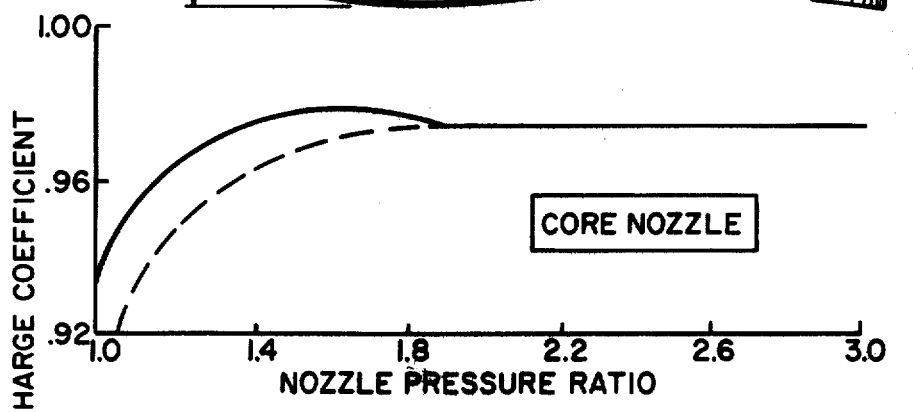
FIG. 9 is a plot of the core and fan nozzle discharge coefficients versus the respective nozzle pressure ratio showing the relationship between operating characteristics of standard tailpipes, and the fishmouth nozzle embodied in the present invention.
Figure 9:
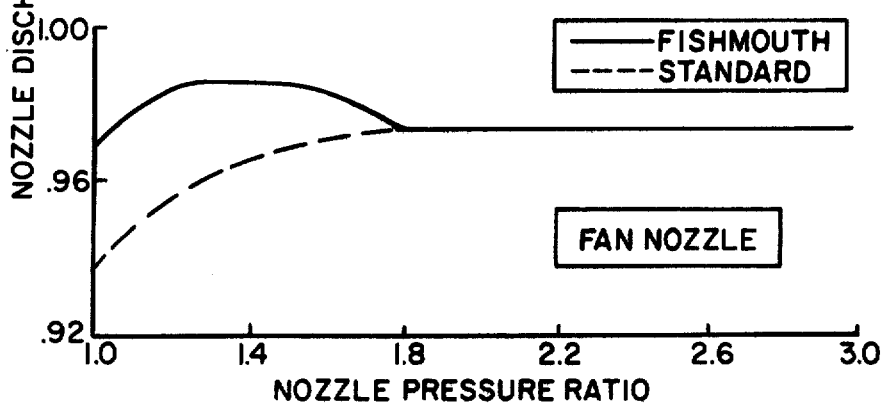

The theory behind this desirable effect is believed to involve local pressure changes due to shearing action between the higher velocity flow 30 and the lower velocity flow 24 as they both pass through the fishmouth nozzle. When unchoked (subsonic) flow exists, pressure in the fishmouth is slightly less than ambient pressure and more flow is induced than with conventional tailpipes. When choked (sonic) flow exists, the lower pressure does not induce more flow than with conventional tailpipes because flow is then controlled by upstream conditions which remain unchanged. The theory has been subjected to model test and the results thereof are expressed in FIG. 9 in terms of discharge coefficient vs. nozzle pressure ratio. Discharge coefficient is a measure of actual nozzle flow relative to ideal nozzle flow of air or gas at a specific total pressure and total pressure. Nozzle pressure ratio is total pressure of the flow relative to the ambient pressure to which the nozzle exhausts. Choked nozzle conditions exist above nozzle pressure ratios of about 2.0 and below that value the flow is unchoked. It can be noted from FIG. 9 that nozzle flows (discharge coefficients) at unchoked conditions are higher with the fishmouth nozzle (solid line) than with the conventional tailpipe standard (dashed line) nozzles. For choked operations, nozzle flow is the same for both type nozzles.

Figure 10:
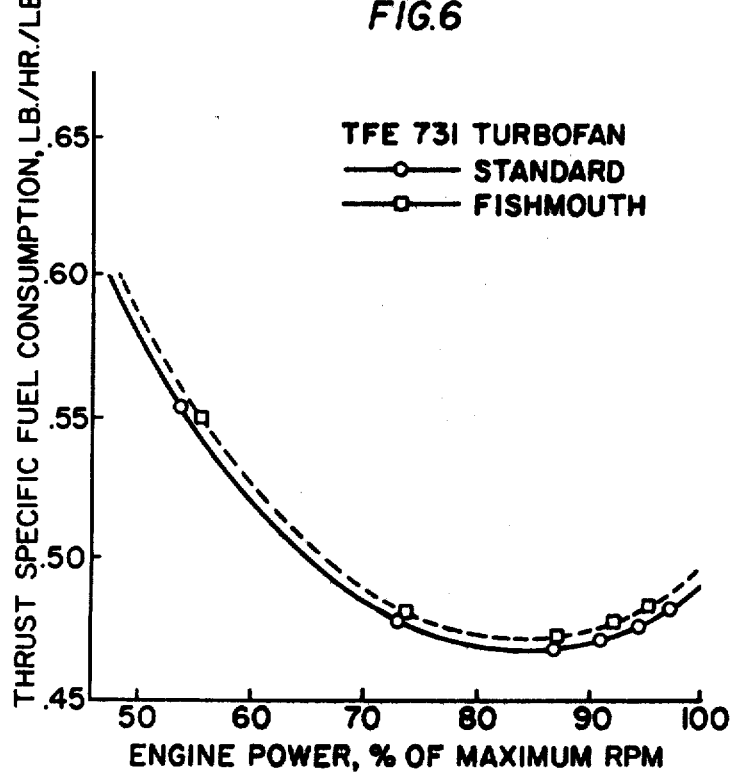
FIG. 10 is a plot of thrust specific fuel consumption data versus engine power level of the fishmouth nozzle embodied in the present invention.

Overall benefits from such flow characteristics of the fishmouth nozzle are that the engine performs better at takeoff conditions (unchoked) with the stowed thrust reverser of the present invention, than it would with conventional tailpipes. The benefit has been verified by full scale engine test and is displayed in FIG. 10 as thrust specific fuel consumption vs. engine power (RPM) level. These data show that the engine produced more thrust per pound of fuel used with the stowed thrust reverser (fishmouth) than with conventional (standard) tailpipes.

It will be apparent that the present invention provides a nozzle and thrust reversing apparatus that is effective in operation and which is mechanically uncomplicated such that a minimum amount of inspection, maintenance, and repair will be required in service. It will be appreciated that the apparatus set forth herein is not limited to target assemblies having only two doors as the reverser can have more than that number if the doors are modified appropriately to insure that they mate properly with one another in all operating positions and also that the internal geometry and design parameters of the elements thereof are in accordance with the teaching of the invention. It must also be emphasized that the thrust reverser nozzle of this invention can be utilized with a turbofan engine in the after fuselage of the aircraft as well as one in a nacelle associated therewith. In some embodiments of the invention, should there be a need to provide a measure of directional control of the gas flow in the reverse thrust position, edge strips or fences (not shown) can be installed on one or both of the longitudinal side edges of the target doors and end plates 86 and 88 can be shaped to meet the requirements. Mechanisms different than the actuator and linkage shown for deploying and stowing of the target doors can also be used.

Although shown and described in what is believed to be the most practical and preferred embodiments, it is apparent that departures from the specific method and apparatus described will suggest themselves to those skilled in the art and may be made without departing from the spirit and scope of the invention. I, therefore, do not wish to restrict myself to the particular methods illustrated and described, but desire to avail myself of all modifications that may fall within the scope of the appended claims.

Thus, having described my invention, what I claim is:

1. In combination with the tailpipes and shrouding structure of a turbofan engine having the exit planes of the annular fan air nozzle and core nozzle substantially near coincidence, a thrust reverser actuatable from a stowed position faired with the shrouding structure to a target position therebehind, said thrust reverser being characterized by the improvement of an interior surface in the stowed position having in great part a substantially cylindrical section extending aft of said fan air nozzle and core nozzle, said cylindrical section maintaining a cross-sectional flow area equal to or greater than the sum of the flow areas of said fan nozzle and core nozzle and the ratio of the diameter of said interior surface to the overall diameter of said fan nozzle is a value greater than one and less than or equal to 1.05.

* * * * *